United States Patent [19]
Tsuda

[11] Patent Number: 5,371,749
[45] Date of Patent: Dec. 6, 1994

[54] APPARATUS FOR PREVENTING AN ERROR OPERATION DURING PART WITHDRAWAL

[75] Inventor: Junichi Tsuda, Kawasaki, Japan
[73] Assignee: Fujitsu Limited, Kanagawa, Japan
[21] Appl. No.: 812,680
[22] Filed: Dec. 23, 1991
[30] Foreign Application Priority Data Dec. 25, 1990 [JP] Japan ............................. 2-405578

[51] Int. Cl.⁵ ............................. G06F 11/00
[52] U.S. Cl. ............................. 371/29.1; 361/801; 361/725
[58] Field of Search ............................. 371/29.1, 5.1, 68.3; 361/395, 415, 801, 725, 802; 439/55, 327; 324/158 R; 395/575

[56] References Cited

U.S. PATENT DOCUMENTS

| | | | |
|---|---|---|---|
| 4,716,495 | 12/1987 | Craker | 361/415 |
| 4,772,210 | 9/1988 | Venaleck | 439/357 |
| 5,128,833 | 7/1992 | Lin et al. | 361/415 |
| 5,191,514 | 3/1993 | Kabat et al. | 361/415 |

FOREIGN PATENT DOCUMENTS

| | | | |
|---|---|---|---|
| 59-158189 | 9/1984 | Japan | H04Q 1/00 |
| 2-133036 | 5/1990 | Japan | H02J 1/00 |

Primary Examiner—Robert W. Beausoliel, Jr.
Assistant Examiner—Albert Decady
Attorney, Agent, or Firm—Staas & Halsey

[57] ABSTRACT

An apparatus for preventing an error operation when withdrawing a part from a panel of an electronic apparatus which includes an abnormal state detecting unit for detecting an abnormal state of the part, a latching mechanism for preventing withdrawal of the part from the panel when the abnormal state detecting unit detects that the part is not abnormal and a latch releasing mechanism for releasing a latch for the part when the abnormal state detecting unit detects that the part is abnormal, whereby a system down state can be prevented.

15 Claims, 14 Drawing Sheets

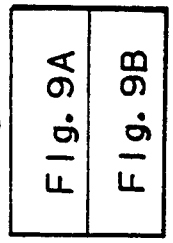

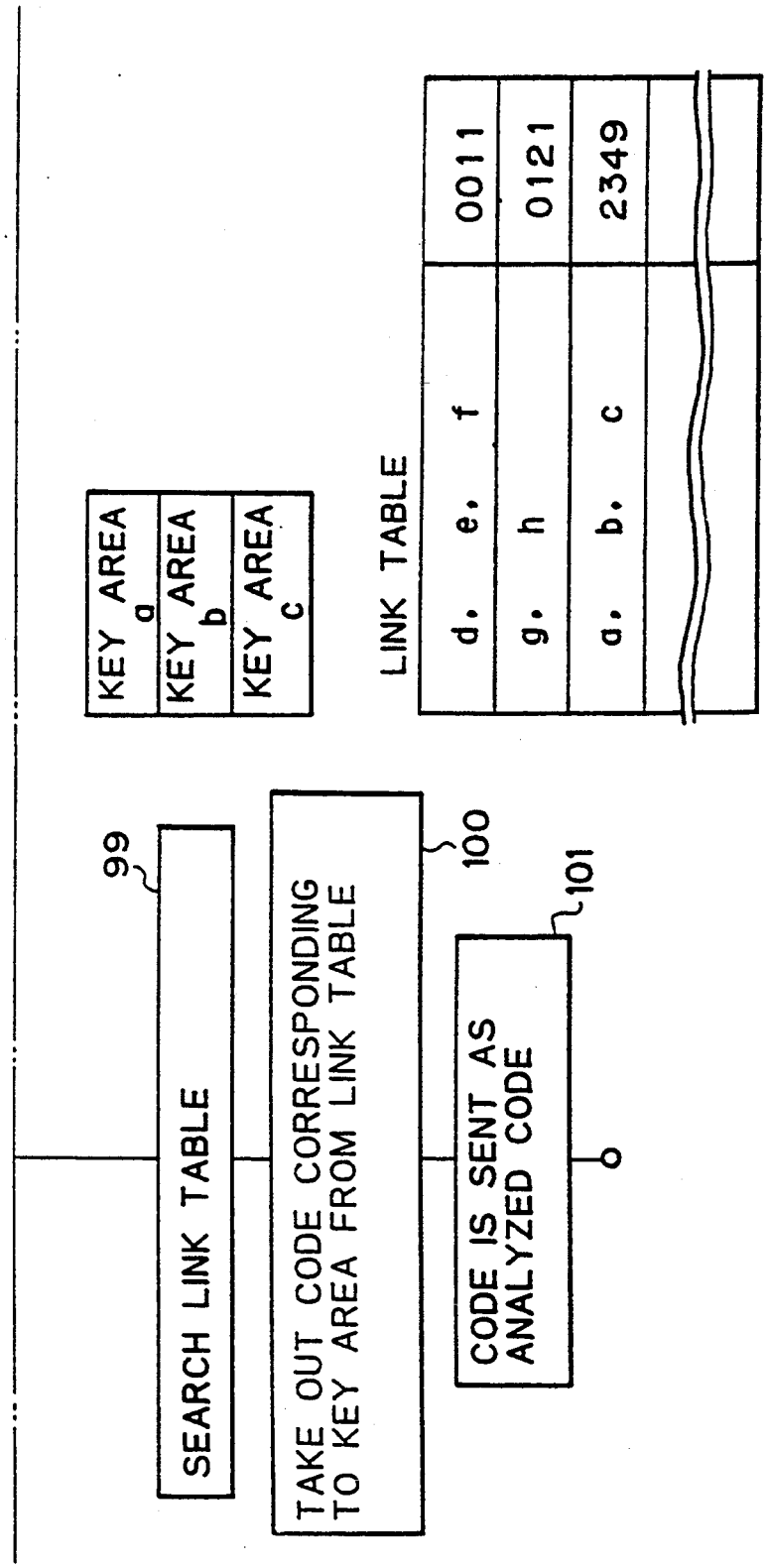

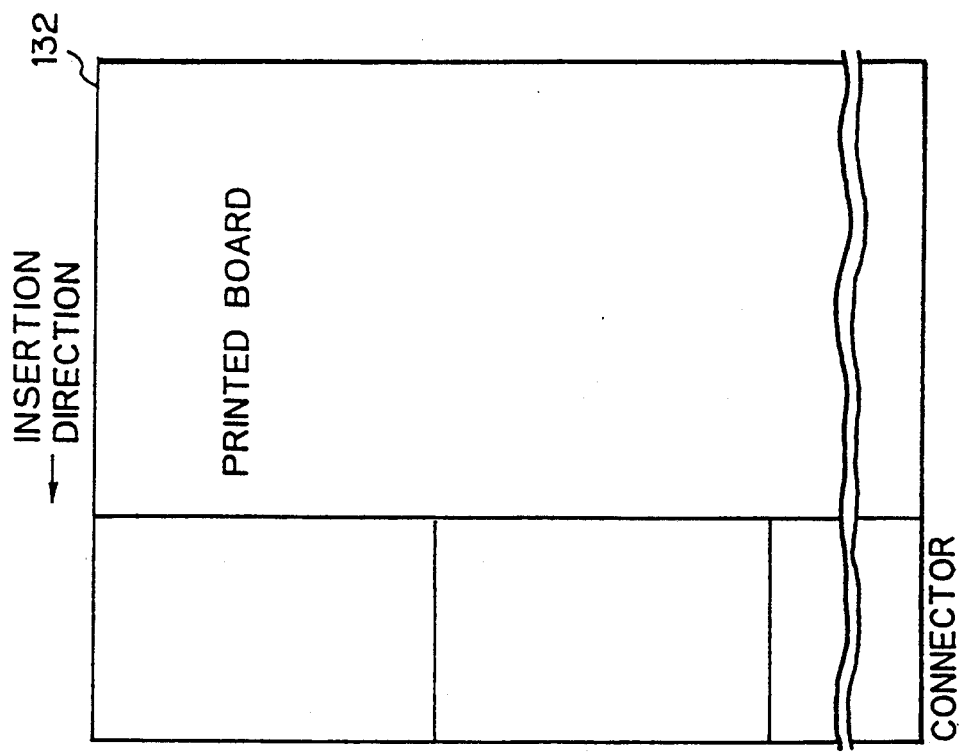
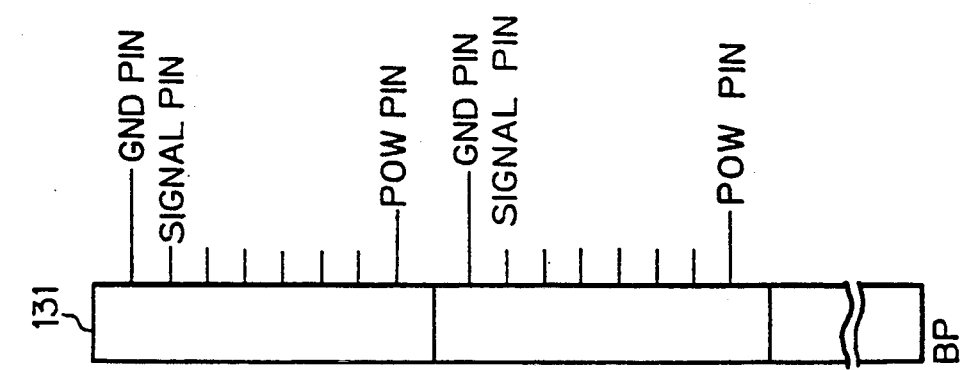
Fig. 13

APPARATUS FOR PREVENTING AN ERROR OPERATION DURING PART WITHDRAWAL

BACKGROUND OF THE INVENTION (1) Field of the Invention

The present invention relates to an apparatus for preventing an error operation during a withdrawal of a part, in particular during maintenance of an electronic apparatus while the apparatus is active.

(2) Description of the Related Art

The recent improvements in the reliability of electronic apparatus such as electronic computer systems have been accompanied by a requirement for maintenance of the apparatus while it is active. Maintenance carried out while the apparatus is active entails withdrawing only a defective part while the apparatus is supplied with electric power.

Many electronic apparatuses are designed to allow maintenance while the apparatus is active, by providing a duplex system of the parts composing the electronic apparatus. This, however, inevitably greatly increases the number of the parts composing the electronic apparatus and further, leads to an increase in the number of maintenance engineers, such as customer engineers (CE), required. In view of this situation, it is important to prevent a system down state of the electronic apparatus due to an error operation caused by withdrawing a functioning part from the electronic apparatus while exchanging a functioning part for a defective part.

Conventionally, a lamp on a defective part is lit, or information that a part is defective is displayed at a display screen, to warn an operator that a part is defective.

These methods have drawbacks, however, in that when a lamp is lit indicating a defective part, it is impossible to prevent a burnout of the lamp due to an end of its operational life, etc., and therefore, a functioning part may be withdrawn in error from the panel of the electronic apparatus.

When displaying information on the display screen, the operator may misread the displayed information, and in such a case also, a functioning part may be erroneously withdrawn from the panel of the electronic apparatus.

If a functioning part is erroneously withdrawn from the panel, the electronic apparatus may be brought to a system down condition.

SUMMARY OF THE INVENTION

Accordingly, an object of the present invention is to provide an error operation preventing mechanism in an apparatus whereby it becomes possible to withdraw only a defective part and is impossible to withdraw a functioning part, to thus prevent an error operation during a part withdrawing operation, and accordingly, prevent a system state down due to an error operation when withdrawing a part from the apparatus.

To attain the above object according to the present invention, there is provided an apparatus for preventing an error operation when withdrawing a part from a panel of an electronic apparatus. The error operation preventing apparatus comprises an abnormal state detecting unit for detecting an abnormal state of the part, a latching mechanism for preventing a withdrawal of the part from the panel when the abnormal state detecting unit detects that the part is not abnormal, and a latch releasing mechanism for releasing the latching of the part when the abnormal state detecting means detects that the part is abnormal.

The electronic apparatus comprises a plurality of parts consisting of a multiplex system that ensures that the electronic apparatus is not brought to a system down state even when one of the parts becomes faulty. An abnormal state detecting unit, a latching mechanism detecting mechanism, and a latch releasing mechanism are provided for each of the parts.

Each of the parts is able to be withdrawn from the panel while an electric power is being supplied to the electronic apparatus, when the latch in the latching mechanism is released by the latch releasing mechanism. Each of the parts has signal pins and power pins, and when withdrawing a part, the signal pins are first withdrawn from the panel and then power pins are withdrawn from the panel.

According to an aspect of the present invention, the apparatus further comprises a lamp connected to the output of the abnormal detecting unit.

According to another aspect of the present invention, the output of the abnormal detecting unit is connected directly to the latch releasing mechanism.

According to still another aspect of the present invention, the output of the abnormal detecting unit is connected directly to the latch releasing mechanism and to a display unit for displaying an abnormal state detected by the abnormal detecting unit.

According to a still further aspect of the present invention, the apparatus further comprises an analyzing unit, connected between the output of the abnormal detecting unit and the input of the display unit, for analyzing the output of the abnormal detecting unit.

According to another further aspect of the present invention, the analyzing unit determines whether or not each of the parts is abnormal, and outputs the result of the analysis.

According to a further aspect of the present invention, the apparatus further comprises a signal converting unit for generating a latch releasing signal based on the result of the analysis by the analyzing unit.

According to another aspect of the present invention, the analyzing unit comprises a search unit for carrying out a search, when the abnormal detecting unit detects that more than one of the parts are abnormal, to determine which of the parts has caused the other parts to become abnormal.

According to a still further aspect of the present invention, the latching mechanism comprises a motor-driven latching mechanism.

According to another aspect of the present invention, the latching mechanism comprises an electronic latching mechanism.

According to yet a further aspect of the present invention, the latching mechanism comprises a manual latching mechanism.

BRIEF DESCRIPTION OF THE DRAWINGS

The above object and features of the present invention will be more apparent from the following description of the preferred embodiment with reference to the accompanying drawings, wherein:

FIG. 9A and 9B are a flowchart explaining the operation of an analyzing unit according to an embodiment of the present invention;

FIG. 13 is a diagram showing an example of a back panel allowing maintenance while power is supplied;

DESCRIPTION OF THE PREFERRED EMBODIMENTS

Figure 14:
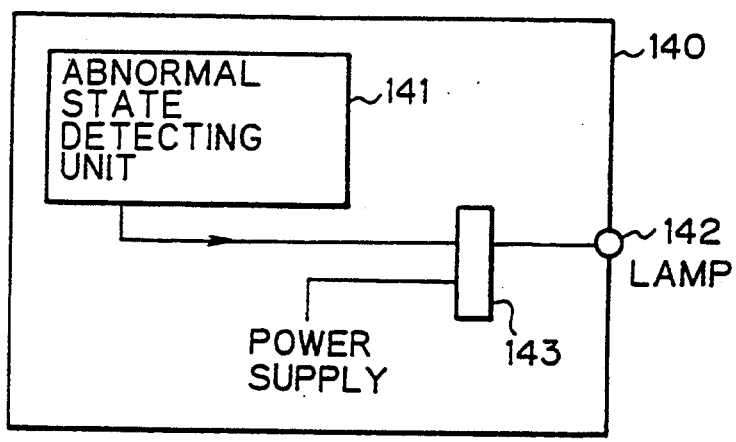
FIG. 14 is a diagram for explaining an example of a conventional method of withdrawing a part.
Figure 15:
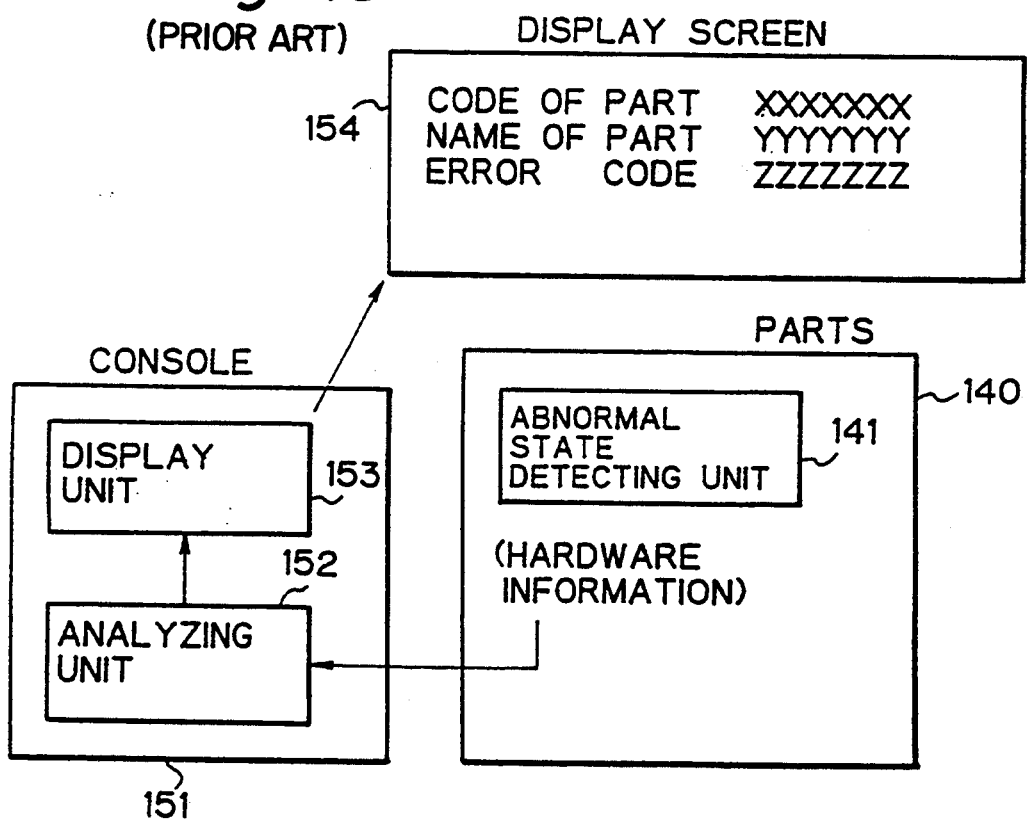
FIG. 15 is a diagram for explaining another example of a conventional method of withdrawing a part.

For a better understanding of the present invention, the conventional methods of withdrawing a part from an electronic apparatus are first described, with reference to FIGS. 14 and 15.

FIG. 14 is a diagram for explaining an example of a conventional part-withdrawing method. In the figure, 140 is a part, such as a printed circuit board, of an electronic apparatus such as a computer system, 141 is an abnormal state detecting unit for detecting whether or not the part 140 is defective, 142 is a lamp indicating whether or not the part 140 is defective, and 143 is an AND gate.

When the abnormal detecting unit 141 detects that the part 140 is abnormal, and generates an abnormal signal, the AND gate 143 is enabled and a power supply is connected through the AND gate 143 to the lamp 142, to turn it ON. Accordingly, an operator, such as a customer engineer (CE), can determine the location of the defective part by observing that the lamp 140 is lit, and then can withdraw the defective part from the panel of the electronic apparatus.

FIG. 15 is a diagram showing another example of a conventional part-withdrawing method. In the figure, 140 is a part, such as a printed circuit board, of an electronic apparatus such as a computer system, 141 is an abnormal state detecting unit for detecting whether or not the part 140 is defective, 151 is a console, 152 is an analyzing unit, 153 is a display unit, and 154 is a picture image displayed at the display unit 153.

The hardware information detected by the abnormal state detecting unit 141 includes data of the position and content of the defective parts. The hardware information is analyzed by the analyzing unit 152 in the console 153, and the results obtained by the analysis are sent to the display unit 153 and are displayed as a defective part code (slot number) XXX, the name of the defective part YYY, and an error code ZZZ. An operator reads the content of the displayed picture image 154 to determine the location of the defective part, and then withdraws the defective part from the panel of the electronic apparatus.

As mentioned before, current electronic apparatuses are designed to allow maintenance while the electronic apparatus is supplied with power. Further, to realize a no-down system, a duplex system is provided in which the constituent parts are duplicated. Namely, due to the duplication of the constituent parts, the same two parts 140 are provided so that, even when one of the two parts 140 becomes defective, the other parts 140 can be used.

In such a no-down system, conventionally the lamp 142 at the defective part 140 is lit to indicate that the part 140 is faulty, as shown in FIG. 14, or the name of the part, slot number (code of the part), and the error code are displayed at the display screen 154 of the display unit 153 in the console 151.

Namely, in the method explained with reference to FIG. 14, a lamp on the defective part 140 is lit, but it is impossible to prevent a burn out of the lamp due to an end of its operating life, etc., and if the lamp is burned out, it is impossible to see that the part 140 is defective even when the abnormal state detecting unit 141 has detected an abnormal state of the part 140. Accordingly, when the parts 140 are duplexed, and when either one of the duplexed parts is known to be defective, for some reason other than that the lamp 142 is lit, the operator or the customer engineer cannot determine which of the duplexed parts is defective. If the operator or the customer engineer arbitrarily withdraws one of the duplexed parts, it is very possible that a good part is withdrawn.

Also, in the conventional method of displaying a part code, the name of the part, and an error code at the display screen 154 of the display unit 153 in the console 141 as shown in FIG. 15, the operator may misread the information displayed at the display screen 154. If the operator misinforms the customer engineer about the displayed information, the customer engineer may withdraw a functioning part in error. Further, even when the customer engineer is going to withdraw a defective part based on correct information, the customer engineer may erroneously withdraw a functioning part instead of the defective part.

When a functioning part is withdrawn, because the system is supplied with power, it will fall into a system down state, because the system includes the withdrawn functioning part as a constituent element thereof. Namely, in the conventional method, when a defective part is to be replaced by a functioning part based on the indication of the lamp 142 or information displayed at the display screen 154, if the user is using the electronic apparatus and power is supplied thereto, the operator or the customer engineer may erroneously withdraw a functioning part and the apparatus falls into a system down state. This is the problem to be solved by the present invention.

Embodiments of the present invention will be described as follows. Throughout the description, the same reference numerals represent the same parts or units.

Figure 1:
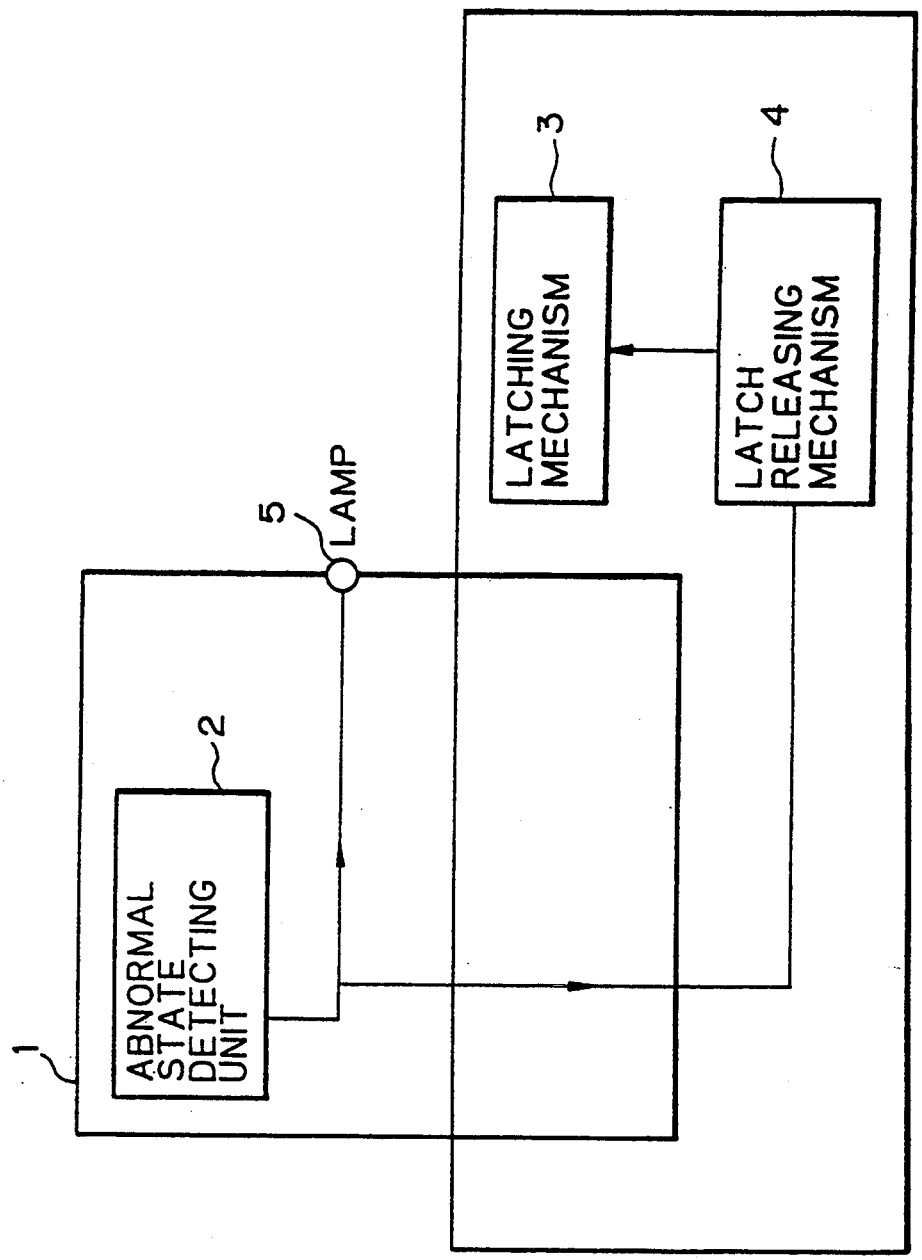
FIG. 1 is a principal block diagram of the present invention.

FIG. 1 is a principal block diagram of the present invention. As shown in the figure, according to the present invention there is provided an apparatus for preventing an error operation when withdrawing a part 1 from a panel of an electronic apparatus. The error operation preventing apparatus comprises an abnormal state detecting unit 2 for detecting an abnormal state of the part 1, a latching mechanism 3 for preventing a withdrawal of the part 1 from the panel when the abnormal state detecting unit 2 detects that the part 1 is not abnormal, and a latch releasing mechanism 4 for releasing a latch holding the part 1 when the abnormal state detecting means detects that the part 1 is abnormal.

The electronic apparatus comprises a plurality of parts 1 consisting of a multiplex system ensuring that the electronic apparatus is not brought to a system down state even when one of the parts 1 becomes faulty. The abnormal state detecting unit 2, the latching mechanism detecting mechanism 3, and the latch releasing mechanism 4 are provided for each of the parts 1.

Each of the parts 1 is able to be withdrawn from the panel while electric power is supplied to the electronic apparatus, when the latch of the latching mechanism 3 is released by the latch releasing mechanism 4. Each of the parts 1 has signal pins and power pins, and when a part 1 is withdrawal, the signal pins are first withdrawn from the panel and then power pins are withdrawn from the panel.

The apparatus further comprises a lamp 5 connected to the output of the abnormal state detecting unit 2. The output of the abnormal state detecting unit 2 is connected directly to the latch releasing mechanism 4.

Since the output of the abnormal detecting unit 2 is connected to the lamp 5 and to the latch releasing mechanism 4, when the part 1 is defective the latch releasing mechanism 4 can be activated even when the lamp is burned out, whereby the latching mechanism 3 is released and the part 1 can be withdrawn from the panel. For the other functioning parts, the corresponding latching mechanisms remain in the latching state. Therefore, only the abnormal detecting unit 2 in the abnormal part 1 detects an abnormal state of that part 1 and outputs an abnormal state detecting signal, whereby the corresponding latch releasing mechanism 4 is activated to change the latching mechanism to a releasing state to thereby release the latching of the defective part 1.

Figure 2:
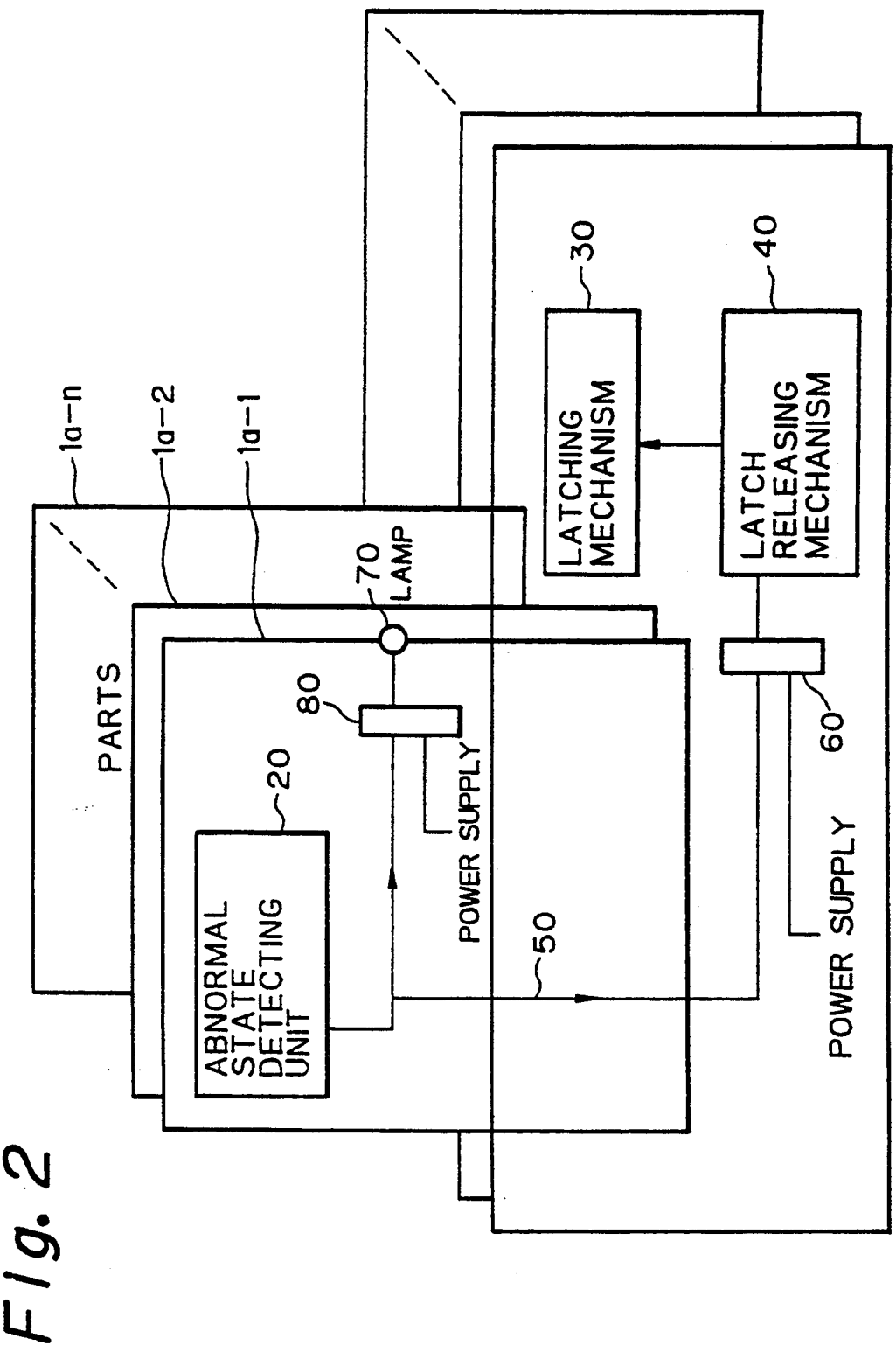
FIG. 2 is a diagram showing a first embodiment of the present invention.

FIG. 2 is a block diagram showing an embodiment of the present invention. In the figure, a plurality of parts 1a-1, 1a-2, . . . and 1a-n are inserted to a panel of an electronic apparatus. The parts are divided into a plurality of groups, each group including a certain number of the same parts; i.e., the parts are multiplexed. For example, the parts are divided into a plurality of pairs of parts, each pair consisting of the same two parts, i.e., the parts are duplicated. Provided for the part 1a-1 are an abnormal state detecting unit 20, a latching mechanism 30, a latch releasing mechanism 40, an output signal 50 from the abnormal state detecting mechanism 20, an AND gate 60, a lamp 70, and an AND gate 80, and similar elements are provided for all of the other parts.

When an abnormal state is detected in the part 1a-1, the output signal 50 from the abnormal state detecting unit 20 is applied to an input of the AND gate 60, and thus power is supplied through the AND gate 60 to the latch releasing mechanism 40. As a result, the latch is released by the latching mechanism 30, and it is then possible to withdraw the part 1a-1 from the panel. The output signal 50 is also applied to an input of the AND gate 80, and thus power is supplied through the AND gate 80 to the lamp 70, and accordingly, as long as the lamp 70 is not burned out, it is lit. Even when the lamp 70 is burned out, since only the defective part is released from the latching state, the customer engineer (CE) cannot withdraw a functioning part, and thus the electronic apparatus to which the parts are inserted cannot fall into a system down state.

Figure 3:
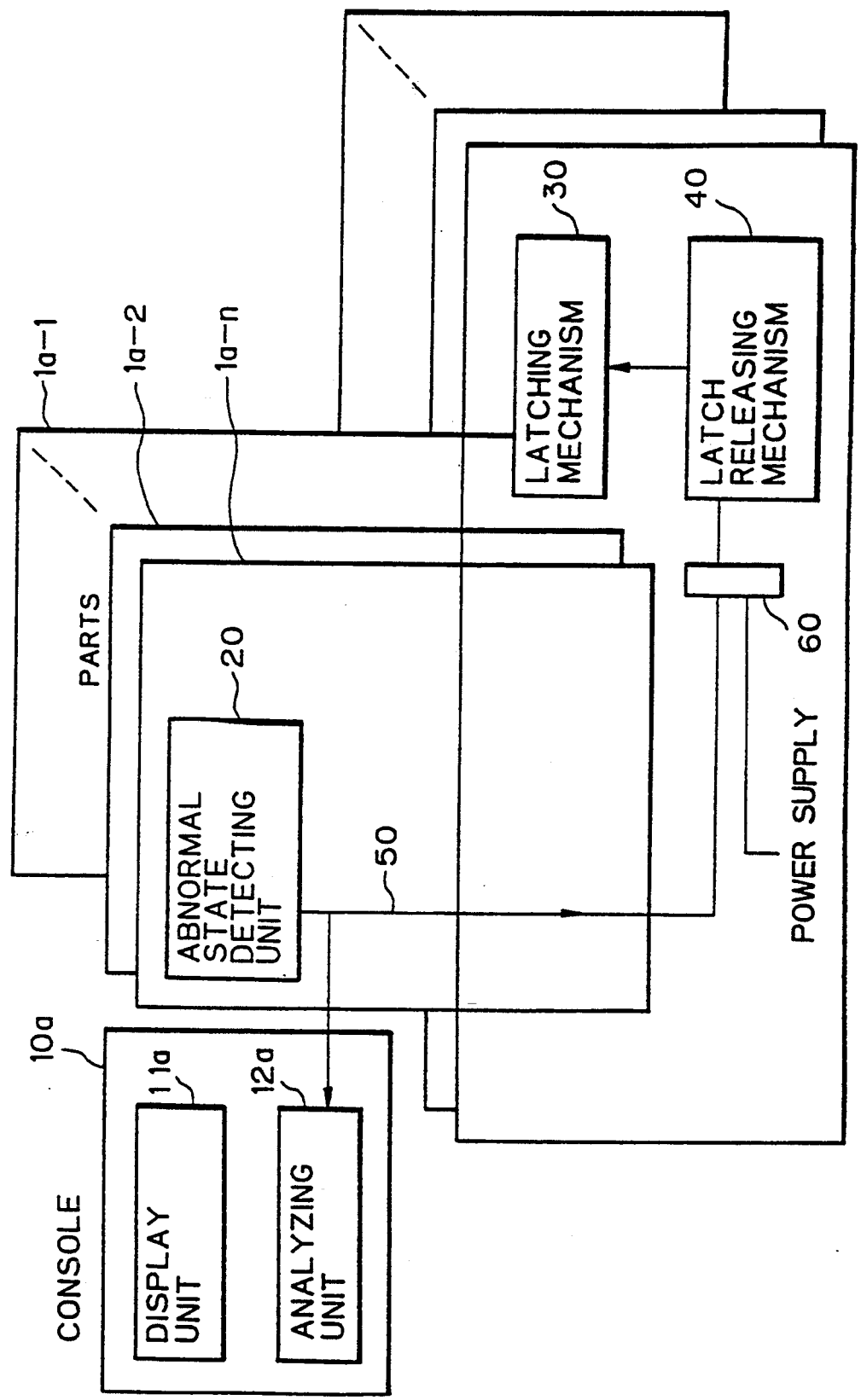
FIG. 3 is a diagram showing a second embodiment of the present invention.

FIG. 3 is a block diagram showing an another embodiment of the present invention. In this embodiment the lamp is omitted, but the abnormal detecting signal 50 from the abnormal state detecting unit 20 or the hardware information collected from the defective part 1a-1 is logged out as log information in a file storage unit (not shown). The log information is analyzed by an analyzing unit 12a in a console 10a, and the result of the analysis is displayed as a slot number of the defective part 1a-1, the name of the defective part 1a-1, and the error code, at the display screen of a display unit 11a in the console 10a. The console 10a is commonly provided to all of the parts 1a-1 to 1a-n, to enable a display for all of the defective parts.

In this embodiment also, when the part 1a-1 is defective, the output signal 50 from the abnormal state detecting unit 20 is applied to an input of the AND gate 60, and thus power is supplied through the AND gate 60 to the latch releasing mechanism 40. As a result, the latching mechanism 30 releases the latching state of the part 1a-1, and thus the part 1a-a can be withdrawn from the panel. Therefore, even when an operator misreads the information displayed at the display screen, when the operator misinforms a customer engineer (CE), when the customer engineer (CE) misinterprets the information from the operator, or when the customer engineer (CE) tries to withdraw a functioning part, the functioning part cannot be withdrawn because it is maintained in the latched state.

Figure 4:
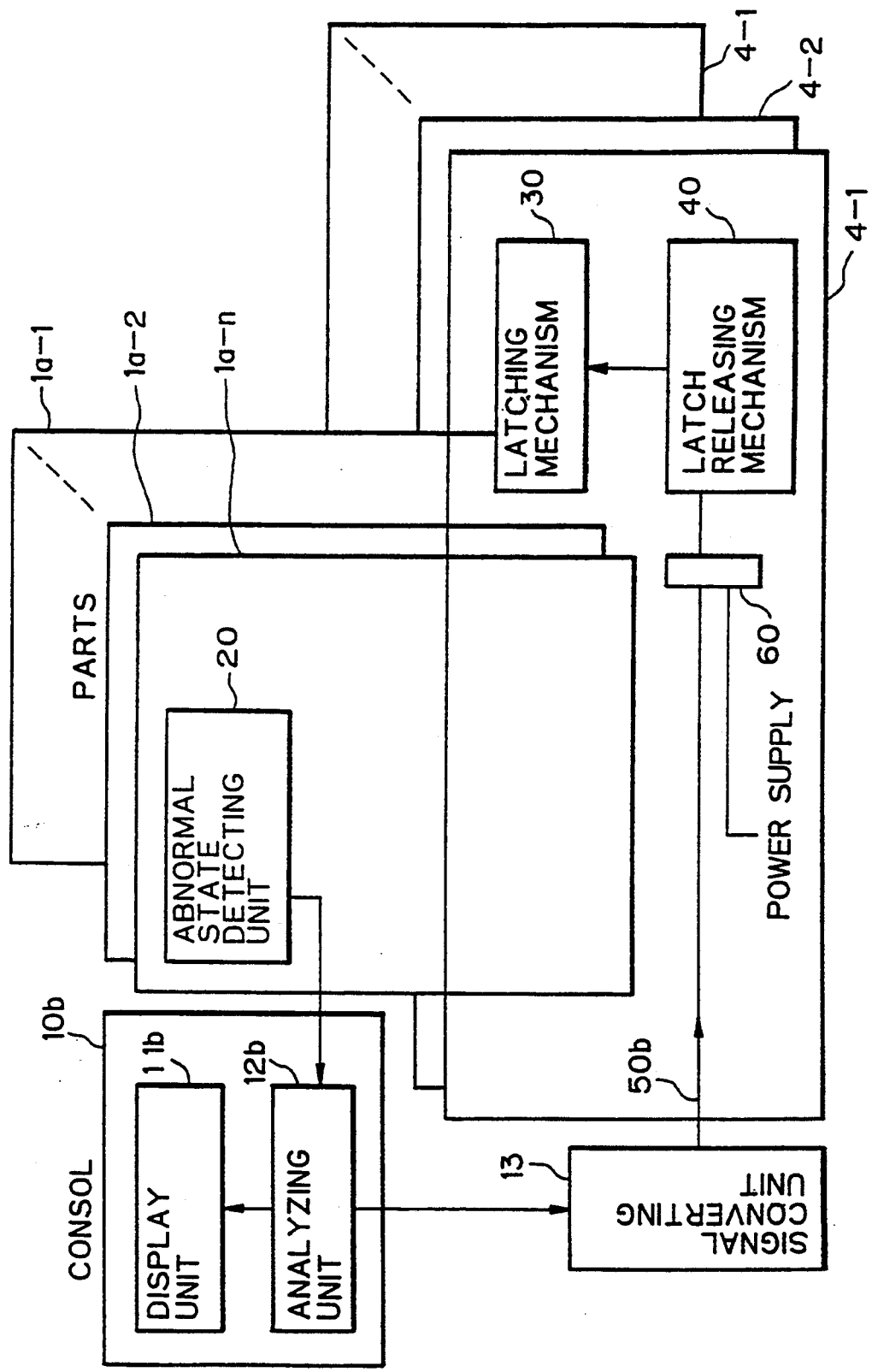
FIG. 4 is a diagram showing a third embodiment of the present invention.

FIG. 4 is a block diagram showing another embodiment of the present invention. In this embodiment, similar to the above-described embodiment, the lamp is omitted. Therefore, when the abnormal state detecting unit 20 detects an abnormal state in the part 1a-1, the output signal from the abnormal state detecting unit 20 is not applied directly to the input of the AND gate 60 but is sent to an analyzing unit 12b. The result of the analysis is displayed as a slot number of the defective part 1a-1, the name of the defective part 1a-1, and the error code, at the display screen of a display unit 11b in the console 10b. Further, the result of the analysis is sent to a signal converting unit 13, which converts the result from the analyzing unit 12b into a latch releasing signal 50b, which is sent to a latch releasing mechanism 40 of the corresponding defective part 1a-1, whereby the defective part 1a-1 is released from the latched state. The console 10a is commonly provided to all of the parts 1a-1 to 1a-n to enable a display for all of the defective parts. Also, the signal converting unit 13 is commonly provided to all of the parts 1a-1 to 1a-n. By this construction also, similar to the embodiment shown in FIG. 3, even when the lamp is omitted, a functioning part cannot be withdrawn from the panel.

Figure 5:
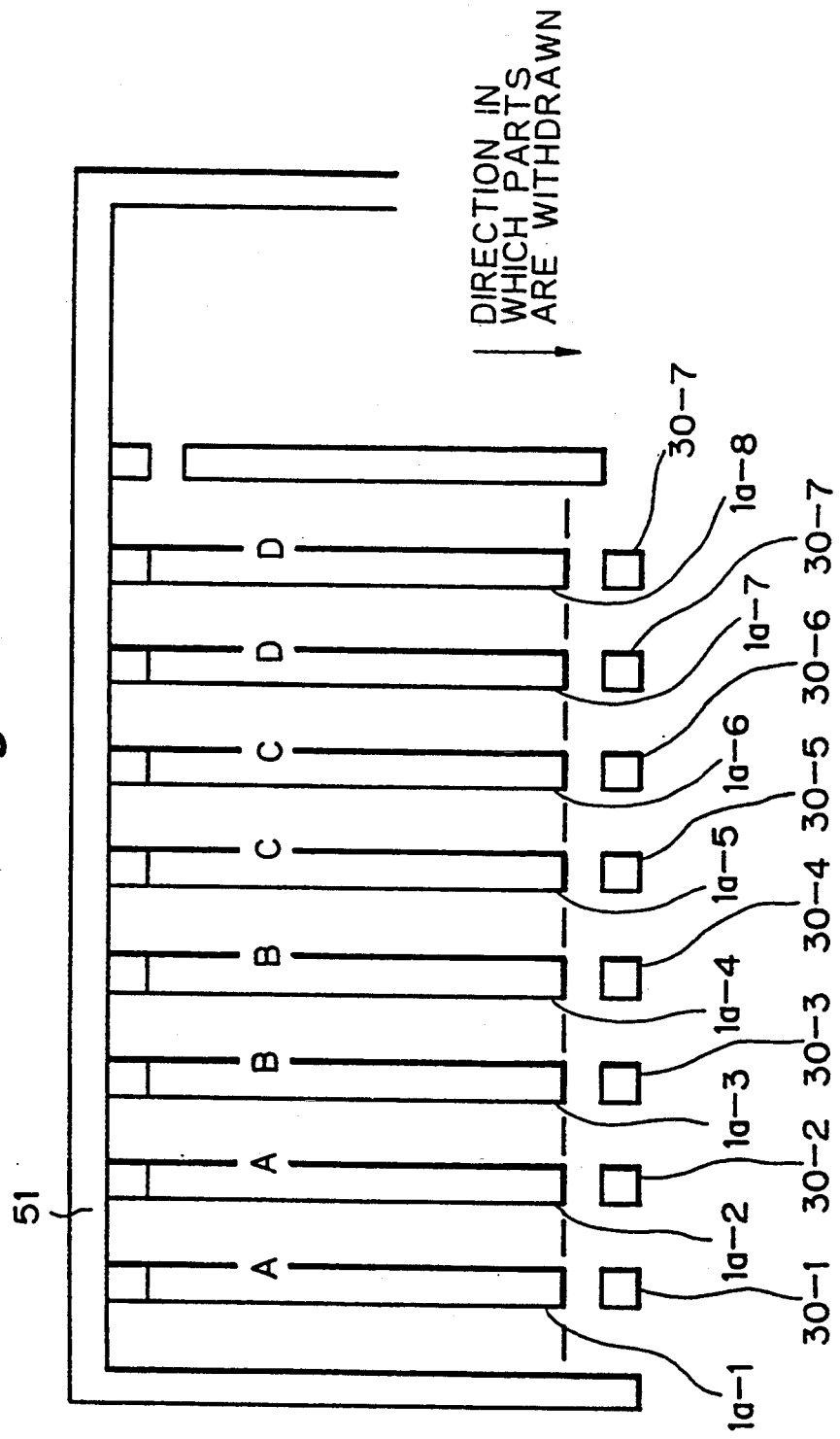
FIG. 5 is a diagram showing a state in which parts are inserted into a panel according to an embodiment of the present invention.

FIG. 5 is a diagram showing the state in which the parts of an electronic apparatus are inserted into a panel, according to an embodiment of the present invention. In the figure, the parts 1a-1, 1a-2, . . . and 1a-8 are inserted into a panel 51. The parts 1a-1 and 1a-2 are printed boards having the same function A. The parts 1a-3 and 1a-4 are printed boards having the same function B. The parts 1a-5 and 1a-6 are printed boards having the same function C. The parts 1a-7 and 1a-8 are printed boards having the same function D. Each part is provided with a latching mechanism 30-1, 30-2, . . . or 30-8. As in the previous embodiments, only a latching mechanism corresponding to a defective part releases the latched state of the part.

Figure 6:
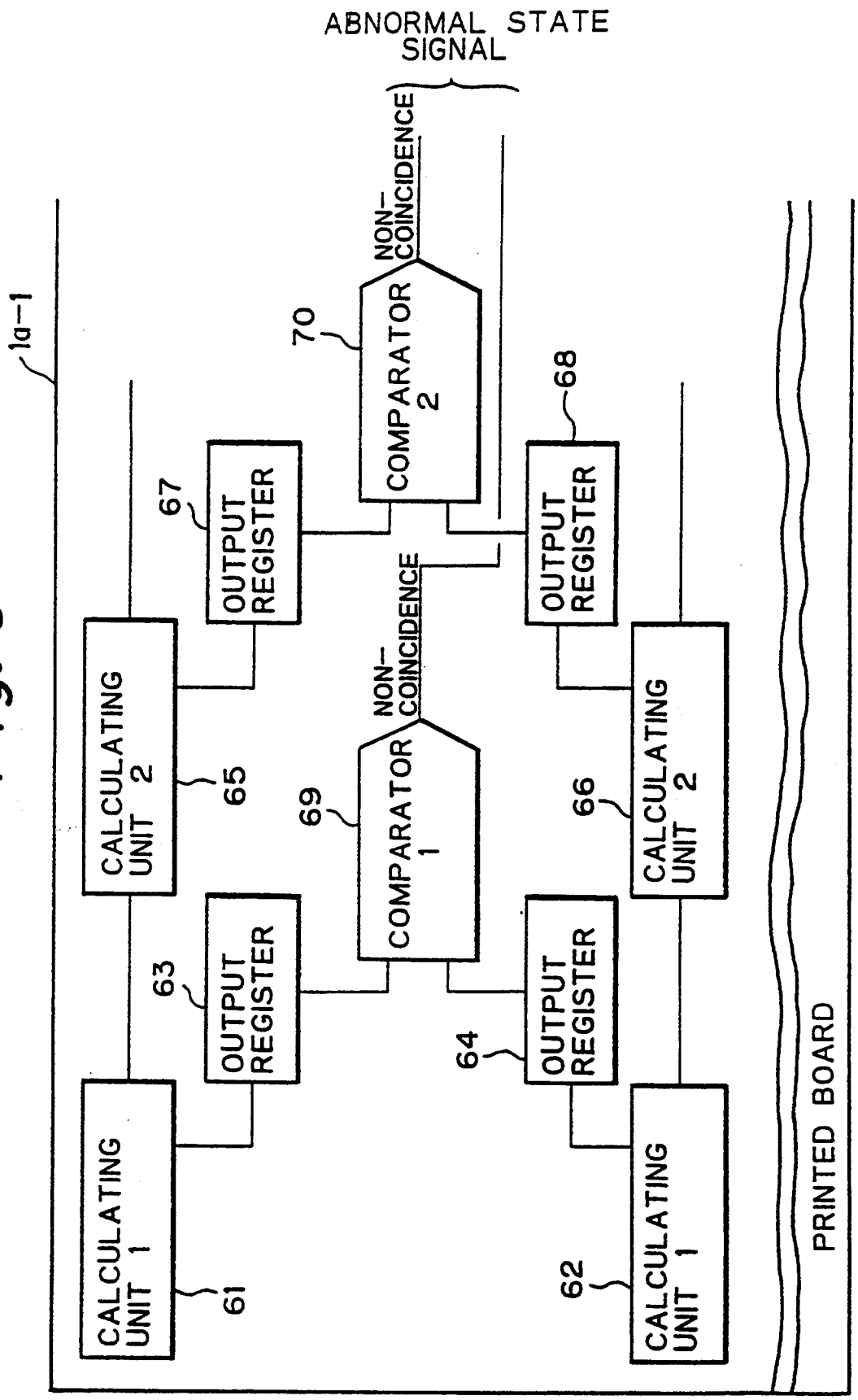
FIG. 6 is a circuit diagram showing an example of an abnormal detecting circuit according to an embodiment of the present invention.

FIG. 6 is a diagram showing an example of the abnormal state detecting unit 20 in the afore-mentioned embodiments. In the figure, the part 1a-1 is shown as a printed board. The printed board contains calculating units 61 and 62, output registers 63 and 64, calculating units 65 and 66, output registers 67 and 68, and comparators 69 and 70 mounted thereon. The calculating units and the output registers are duplicated, respectively. Here, if the result of a comparison of the outputs of the output registers 63 and 64 shows a non-coincidence, or if the result of a comparison of the outputs of the output registers 67 and 68 shows a non-coincidence, the part 1a-1 is deemed to be defective and an abnormal state signal is output from the abnormal state detecting circuit 20.

Figure 7:
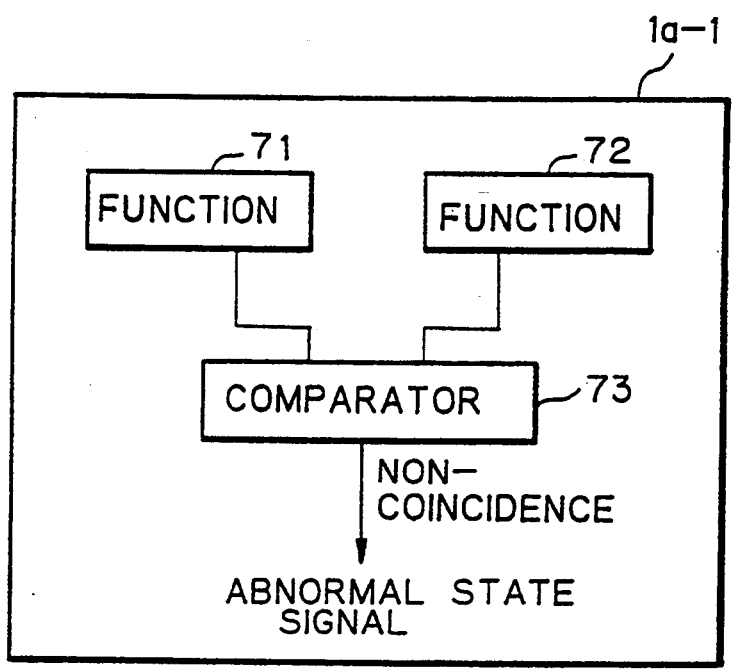
FIG. 7 is a block diagram showing another example of an abnormal detecting circuit according to an embodiment of the present invention.

The construction of the abnormal state detecting unit 20 is not restricted to that shovel in FIG. 6, but may be the construction as shown in FIG. 7, in which the same functions 71 and 72 are provided, as a duplex system, in the part 1a-1, and the same functions 71 and 72 are compared by a comparator 73. If the result of the comparison shows a non-coincidence, an abnormal state signal is output.

Figure 8:
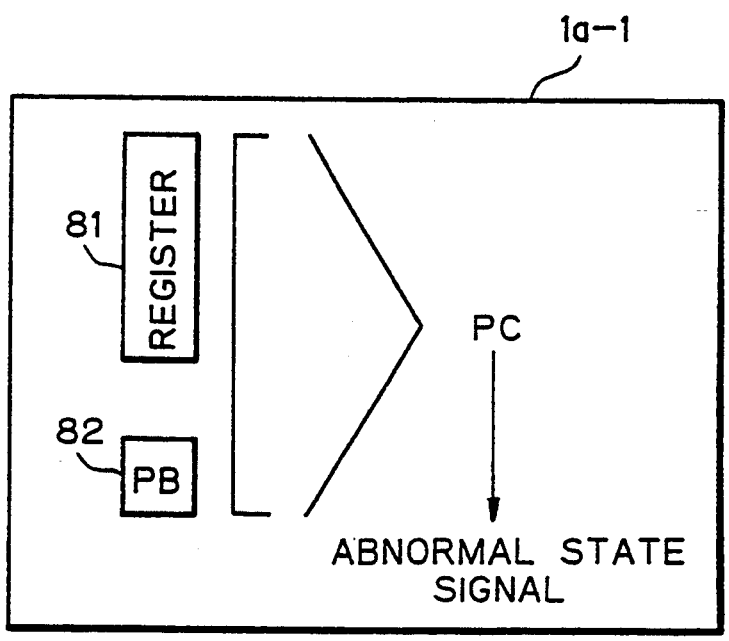
FIG. 8 is a block diagram showing still another example of an abnormal detecting circuit according to an embodiment of the present invention.

It is also possible to constitute the abnormal detection unit 20 as shown in FIG. 8, in which the outputs of a register 81 and a parity bit PB are subject to a parity check PC.

FIGS. 9A and 9B are a flowchart explaining an example of the operation of the analyzing unit 12b in the console 10b of the embodiment shown in FIG. 4.

As shown in the figures, at step 91 hard information (log information) of units (the part 1-1, 1-2, . . . and 1-n) is stored in a storage disk in the analyzing unit (supervisory unit SVP) 12b.

At step 92, error latch groups of level 0, level 1, and level 2 are taken out from the log information. The level 0, level 1, and level 2, respectively, represent the degree of seriousness of the errors. For example, the error latch group of level 0 represent the maximum degree of seriousness of the errors, including the information on the location and the content of the error of the part that is the fundamental cause of the sequence of the errors.

At step 93, it is determined whether or not only one error level 0 latch is active. If the result is yes, at step 94 the error level 0 latch is coded. The analyzing unit 12b includes a dictionary (not shown), and the code is obtained by searching the dictionary. The obtained code represents the location of the part causing the error, and the content of the error. Then, at step 95 the code is sent as the result of the analysis to the signal converting unit 13, wherein the code is converted into the abnormal state detecting signal 50b and is sent through the AND gate 60 to the latch releasing mechanism 40 corresponding to the part.

When the result is no at step 93, the process goes to step 96 to determine whether or not the error level 0 latch is active. If the result is no then, at step 97, all of the non-active error latches are coded, and at step 95, the codes are converted into abnormal state detecting signals and are sent to the latch releasing mechanisms corresponding to the parts.

At step 96, when it is determined that a plurality of the error level 0 latches are active, the process goes to step 98 and the error level 0 latches are stored to a key area. The key area stores the error latches a, b, c, . . . of the active level 0. Then, at step 99, a search of a link table is carried out, and at step 100, a code corresponding to the data in the key area is taken from the link table. In the illustrated example, the key area stores the error latches a, b, and c, and thus the code corresponding to the stored contents is 2349. The link table stores a code corresponding to the group of active levels. If there is one or more active levels 0, a code corresponding to the group can be determined by searching the link table. The code thus-searched represents the location of the part deemed to be a fundamental cause of the errors, and the content of the error in the part. For example, the code corresponding to the error latch groups d, e, and f is 0111, and the code corresponding to the error latch groups g, and h is 0121. Accordingly, at step 101, the code is sent as a result of an analysis to the signal converting unit 13, wherein the code is converted to an abnormal state detecting signal 50b and is sent through the AND gate 60 to the latch releasing mechanism of the corresponding part.

Thus, when there is a single error latch of the level 0, the error latch is coded; when there are a plurality of error latches of the level 0, a code corresponding to the latch group is taken out from the link table; and when there is no error latch of the level 0, all of the error latches are given non-active codes. Then, the coded information is sent to the signal converting unit 13, which then supplies an abnormal state signal to the latch releasing mechanism corresponding to the part in the location corresponding to the received code.

In this way, even when a plurality of parts output abnormal state detecting signals, a part which is the fundamental cause of the errors is determined, and a latch releasing signal is supplied only to that part.

Figure 10:
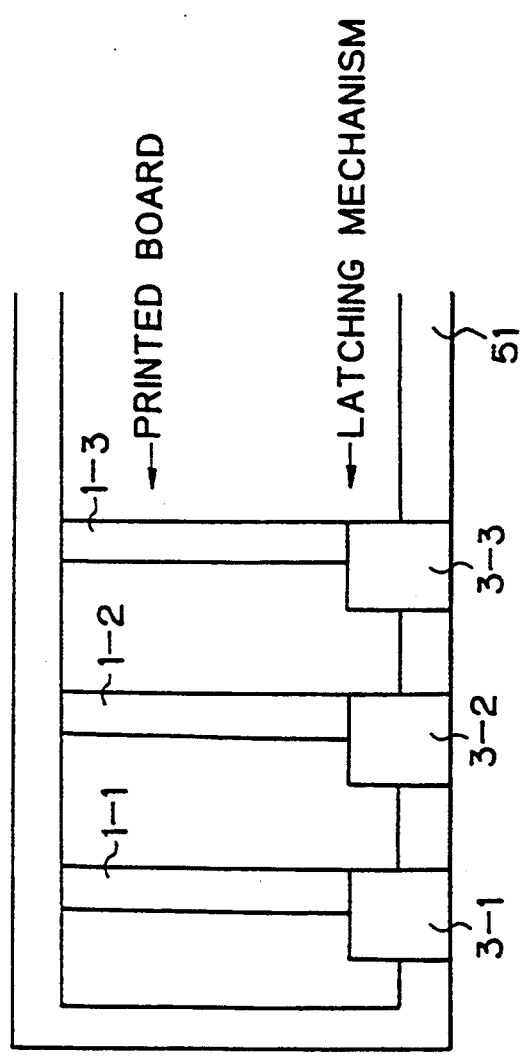
FIG. 10 is a diagram showing an example of an arrangement of a latching mechanism according to an embodiment of the present invention.

FIG. 10 is a diagram showing the arrangement of the latching mechanism according to an embodiment of the present invention. In the figure the latching mechanisms 3-1, 3-2, 3-3, . . . are provided, for example, at the bottom of a shelf 51 of the panel.

Figure 11:
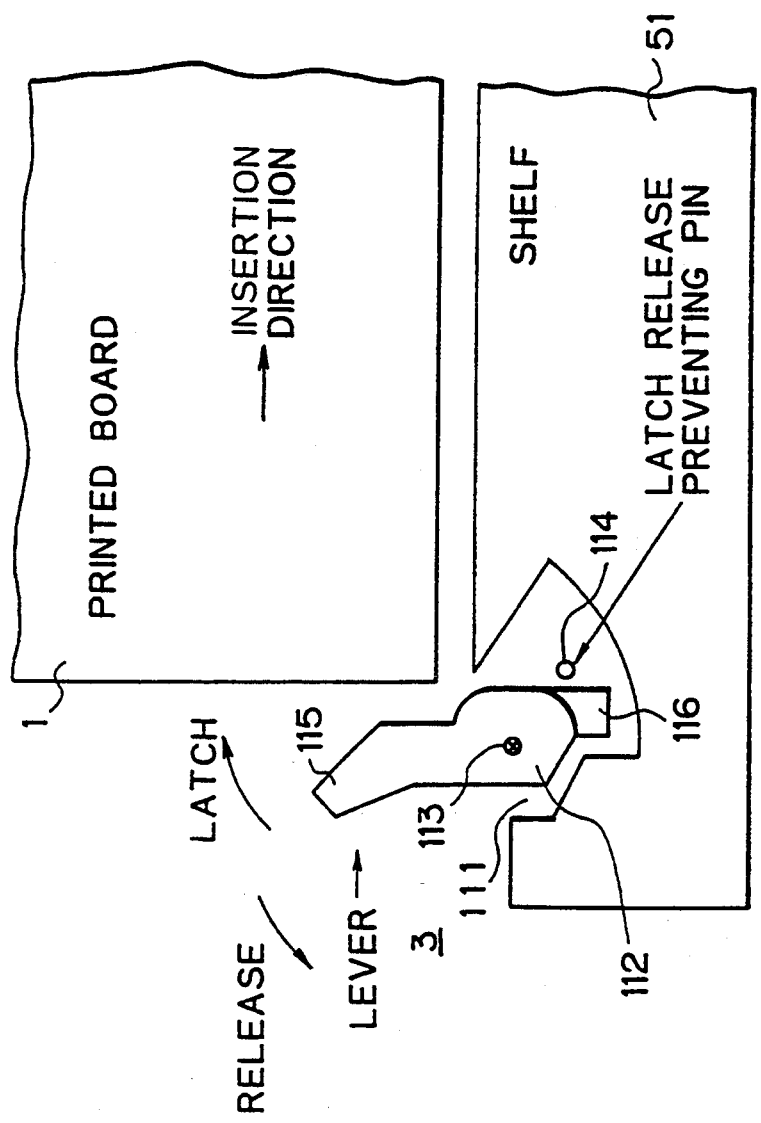
FIG. 11 is an expanded cross sectional diagram showing the latching mechanism according to an embodiment of the present invention.

FIG. 11 is an expanded cross sectional diagram of one of the latching mechanism shown in FIG. 10. In the figure, 111 is a notch portion provided in the shelf 51, 112 is a lever for preventing the printed board 1 from being withdrawn when in the latched state, 113 is a rotating axle of the lever 112, 114 is a latch release preventing pin, 115 is an end of the lever 112, and 116 is another end of the lever 112. In the latched state as illustrated, if an attempt is made to rotate the lever 112 in the counterclockwise direction, the end 116 of the lever 112 collides with the latch release preventing pin 114 and thus the rotation is prevented. Therefore, if an attempt is made to withdraw the printed board 1, the end of the lever 115 prevents the withdrawal of the part 1. In the latch released state, the latch release preventing pin 114 is moved rearward or frontward with respect to the paper so that the lever 112 can be freely rotated, and thus the printed board 1 can be withdrawn.

Figure 12:
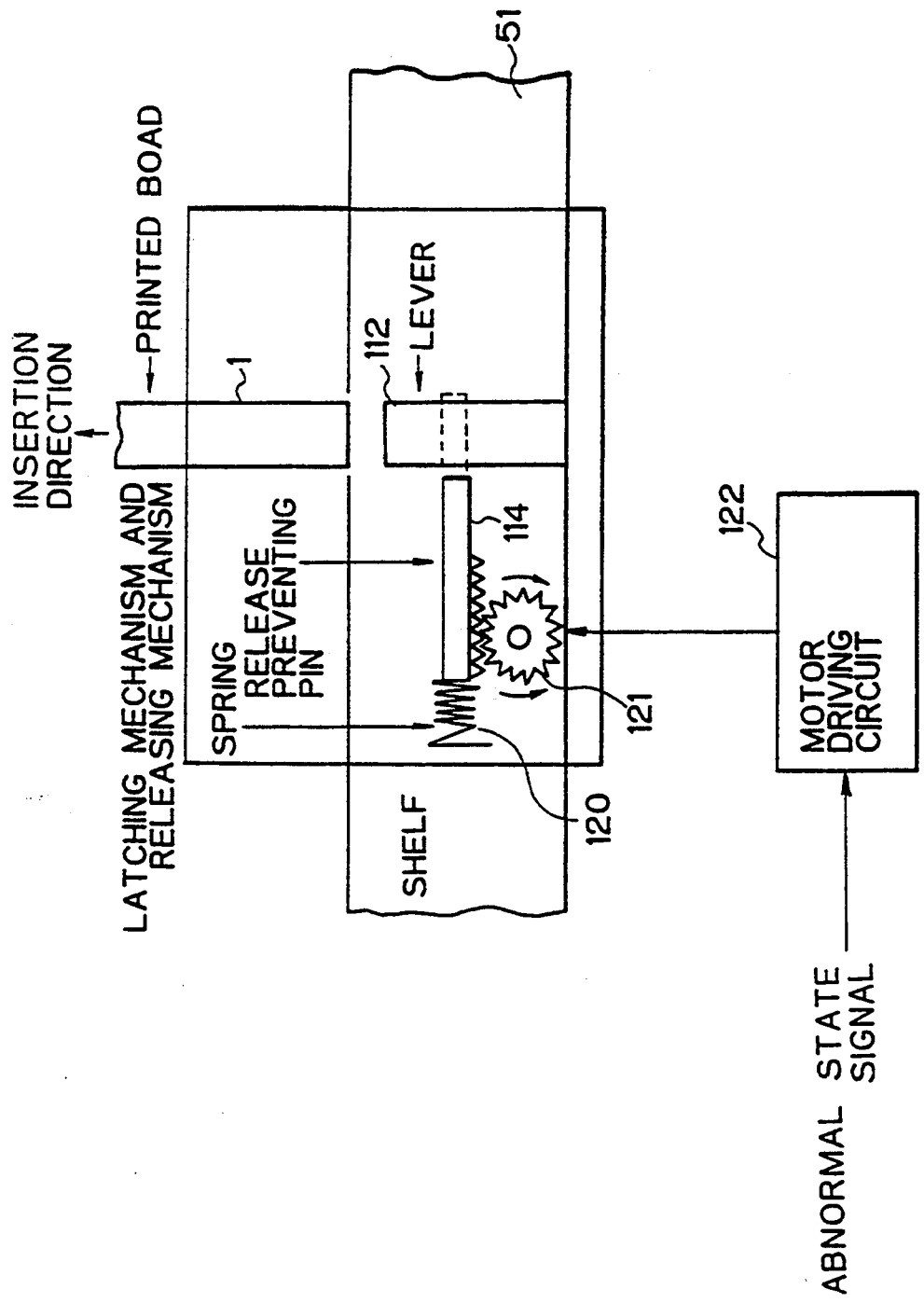
FIG. 12 is a diagram showing the construction of the latching mechanism according to an embodiment of the present invention.

FIG. 12 is a diagram showing the latching mechanism and the latch releasing mechanism. In the figure, 120 is a spring for pressing the latch release preventing pin 114 in the latched state to the required position under the printed board 1, 121 is a motor which, in the latch released state rotates to move the latch release preventing pin 114 to the left, through a gear, to enable the lever 112 to be freely rotated, and 122 is a motor drive circuit.

When the abnormal state signal indicating that the part 1 is defective is input to the motor drive circuit 122, the motor 121 is rotated so that the lever 112 moves from the illustrated dotted position to the left. As a result, the lever 112 can be freely rotated, and thus the printed board 1 can be withdrawn from the panel. After the defective part is withdrawn, the abnormal state signal disappears, and accordingly, the motor drive circuit 122 stops driving the motor 121. As a result, the latch release preventing pin 114 is pushed by the spring 120 again to the position illustrated by a dotted line. At this time, however, the lever 112 is still in the latch release state, and thus the end 116 of the lever 112 rests on the upper side of the latch release preventing pin 114, and thus a functioning part can be inserted into the panel. After inserting the functioning part, the latch release preventing pin 114 is once again moved to the left, to place the lever 112 again in the latched state, and then the latch release preventing pin 114 is again pushed by the spring 120 to the illustrated dotted line position.

FIG. 13 shows an example of a back panel which allows maintenance while power is supplied to the electronic apparatus. In the figure, 131 is a back panel and 132 is a printed board. The back panel 131 is provided with ground pins GND, power pins POW, and signal pins SIGNAL. The printed board 132 is provided, at the insertion portion thereof, with connectors having conductive holes corresponding to the above-mentioned various pins. The ground pins are the longest, and the power pins are longer than the signal pins.

Accordingly, when the printed board 132 is inserted to the back panel 131, the ground pins GND are first inserted, then the power pins POW are inserted, and finally, the signal pins SIGNAL are inserted, into the back panel 131. Therefore, when the power pins POW are inserted, various functions in the printed board 132 are reset, and when the signal pins SIGNAL are inserted, since the reset is already completed, the signals are correctly transferred to the printed board 132.

When the printed board 132 is withdrawn from the back panel 131, the signal pins SIGNAL are first withdrawn, in a power stable state in which the ground pins GND and the power pins POW are connected to the back panel. Therefore, the printed board 132 can be withdrawn from the panel without causing noise at other printed boards.

In the foregoing embodiments, it is assumed that the maintenance of the electronic apparatus can be carried out while electric power is conducted therethrough, but the present invention is not restricted to this condition and can be applied to the case where the maintenance is effected when the electric power is cut off. Also, the parts are not necessarily multiplexed to ensure a no down state of the system.

From the foregoing description, it will be apparent that, according to the present invention, by providing an error operation preventing mechanism in the apparatus it becomes possible to withdraw only a defective part and impossible to withdraw a functioning part, and thus the apparatus prevents an error operation when a part is to be withdrawn, whereby a system down state due to an error in the withdrawing of a part can be prevented.

I claim:

1. An apparatus for preventing a system failure when withdrawing a single electronic part of a group of electronic parts from a panel of an electronic device, wherein said electron device comprises a plurality of multiplexed parts to insure that said electronic device is not brought to a system down state when one of said parts becomes faulty, said apparatus comprising:
   abnormal state detecting means for detecting an abnormal state of each individual part;
   latching means for preventing withdrawal of said part from said panel when said abnormal state detecting means detects that said individual part is normal; and
   latch releasing means for releasing said latching means for said individual part when said abnormal state detecting means detects that said part is abnormal;
   wherein said abnormal state detecting means, said latching means, and said latch releasing means are provided for each of said electronic parts, each individual electronic part is adapted to be withdrawn from said panel while electric power is supplied to said electronic device when the latch means is released by said latch releasing means,
   each of said parts having signal pins and power pins, and when said part is withdrawn from said panel, said signal pins are first withdrawn from said panel and then said power pins are withdrawn from the panel.

2. An apparatus as set forth in claim 1, wherein an output of said abnormal state detecting means is connected directly to said latch releasing mechanism.

3. An apparatus as set forth in claim 1, wherein an output of said abnormal state detecting means is connected directly to said latch releasing mechanism and to a display means for displaying an abnormal state detected by said abnormal state detecting means.

4. An apparatus as set forth in claim 2, further comprising analyzing means, connected between the output of said abnormal state detecting means and an input of said display means, for analyzing the output of said abnormal state detecting means.

5. An apparatus as set forth in claim 4, wherein said analyzing means determines whether each of said parts is abnormal, and outputs an analysis result.

6. An apparatus as set forth in claim 1, further comprising analyzing means for analyzing the output of said abnormal state detecting means, and signal converting means for generating a latch releasing signal based on a result of the analysis by said analyzing means.

7. An apparatus as set forth in claim 6, wherein said analyzing means comprises means for determining, when said abnormal state detecting means detects an abnormal state of a plurality of said parts, which of at least one of said parts has caused the abnormal state of said plurality of parts.

8. An apparatus as set forth in claim 1, wherein said latching mechanism comprises a motor-driven latching means.

9. An apparatus as set forth in claim 1, wherein said latching mechanism comprises an electronic latching means.

10. An apparatus as set forth in claim 1, wherein said latching mechanism comprises a manual latching means.

11. An apparatus for preventing a system failure when withdrawing a single electronic part of a group of electronic parts from a panel of an electronic device, wherein said electronic device comprises a plurality of multiplexed parts to insure that said electronic device is not brought to a system down state when one of said parts becomes faulty, said apparatus comprising:

- abnormal state detecting means for detecting an abnormal state of each individual part;
- latching means for preventing withdrawal of said part from said panel when said abnormal state detecting means detects that said individual part is normal; and
- latch releasing means for releasing said latching means for said individual part when said abnormal state detecting means detects that said part is abnormal;
- wherein said abnormal state detecting means, said latching means, and said latch releasing means are provided for each of said electronic parts, each individual electronic part is adapted to be withdrawn from said panel while electric power is supplied to said electronic device when the latch means is released by said latch releasing means.

12. The apparatus of claim 11 further comprising:
signal means operatively connected to said abnormal state detecting means and responsive to the detection of an abnormal state thereby for being activated and identifying the abnormal electronic part.

13. The apparatus of claim 12 wherein the signal means comprises a light.

14. The apparatus of claim 12 wherein the signal means comprises a computer output device.

15. A failure prevention system for an electronic device having at least one group of associated and duplicate First and second parts, each part being selectively and removably received in a corresponding part location in the device and operative in a normal state to maintain operation of the device and the second part being operative in an abnormal state of the first part and in the alternative thereto, in the normal state of the second part, to maintain operation of the device, the failure prevention system comprising:

- first and second abnormal state detectors, respectively associated with the first and second parts, each detecting an abnormal state of the respective part and producing a corresponding output;
- first and second latch mechanisms respectively associated with the first and second parts, each latch mechanism having a latching position and a release position and being selectively movable therebetween and each thereof, in the latch position, latching and preventing removal of the respective part from, and, in the release position, releasing and permitting removal of the respective part from, the respective part location in the device;
- first and second latch release mechanisms respectively operable in response to the corresponding outputs of the first and second abnormal state detectors for selectively moving the respective first and second latch mechanisms from the latching position to the release position thereof;
- first and second sets of electrical connectors mounted in said device at said corresponding part locations of, and respectively associated with, the first and second parts, said first and second parts having corresponding electrical coupling connectors selectively engageable with the first and second electrical connectors when the corresponding part is received in the corresponding part location in the device and held in position therein by the respective latch mechanism; and
- the second latch mechanism remaining in the latch position in accordance with the normal state of the second part and preventing removal of same from the device when the first latch mechanism is moved to the release position by the latch release mechanism responsive to the detection of the abnormal state of the first part and the second part thereby maintaining device operation in the abnormal state of the first part and upon and during removal of the first part from the device.

* * * * *

UNITED STATES PATENT AND TRADEMARK OFFICE
CERTIFICATE OF CORRECTION

PATENT NO. : 5,371,749
DATED : December 6, 1994
INVENTOR(S) : Junichi TSUDA

It is certified that error appears in the above-indentified patent and that said Letters Patent is hereby corrected as shown below:

Col. 2, line 11, delete "an".

Col. 5, line 28, delete "withdrawal" and insert therefor --withdrawn--.

Col. 6, line 12, delete "an".

Col. 10, line 47, delete "the" and substituted --an--.

Col. 11, line 33, delete "First" and insert therefor --first--.

Signed and Sealed this

Twenty-first Day of March, 1995

Attest:

BRUCE LEHMAN

Attesting Officer

Commissioner of Patents and Trademarks